United States Patent [19]
Harries

[11] Patent Number: 5,795,263
[45] Date of Patent: Aug. 18, 1998

[54] ACTUATION SYSTEMS AND MECHANISMS

[75] Inventor: David Anthony Harries, Welford on Avon, Great Britain

[73] Assignee: Kongsberg Techmatic UK Limited, Leamington Spa, England

[21] Appl. No.: 572,150

[22] Filed: Nov. 22, 1995

[30] Foreign Application Priority Data

| | | | |
|---|---|---|---|
| Mar. 29, 1994 | [GB] | United Kingdom | 9406271 |
| Jul. 12, 1994 | [GB] | United Kingdom | 9414035 |
| Oct. 18, 1994 | [GB] | United Kingdom | 9420981 |
| Mar. 29, 1995 | [WO] | WIPO | PCT/GB95/00709 |

[51] Int. Cl.⁶ .................................................. F16D 25/12
[52] U.S. Cl. ................................... 477/113; 192/30 W
[58] Field of Search ............................... 60/547.1, 534; 192/85 C, 30 W, 91 R; 477/166, 180, 181, 113, 195, 112

[56] References Cited

U.S. PATENT DOCUMENTS

| | | | |
|---|---|---|---|
| 2,867,131 | 1/1959 | Schroeder | 477/113 X |
| 3,134,269 | 5/1964 | Shimanckas | 477/113 |
| 3,330,390 | 7/1967 | Kobelt | 477/113 |
| 5,066,077 | 11/1991 | Farr | 477/195 X |
| 5,390,497 | 2/1995 | Cottam | 60/533 |

FOREIGN PATENT DOCUMENTS 2110334  6/1983  United Kingdom ............. 192/30 W

*Primary Examiner*—Khoi Q. Ta
*Attorney, Agent, or Firm*—Paul E. Milliken; Lee A. Germain

[57] ABSTRACT

An actuation system particularly for a vehicle clutch, in which a source of pressurized fluid is interconnected with a slave cylinder (11) via a displacement means (12). The displacement means (12) includes a component which is displaced by the pressurized fluid from the source to provide a displacement proportional to the actuating movement of the slave cylinder (11) caused by the pressurized fluid, and a sensing means is provided which is operable to measure the displacement to indicate the actuating movement of the slave cylinder. Various displacement means in the form of valves are disclosed together with a mechanism for interconnecting the operation of a vehicle clutch and throttle.

29 Claims, 14 Drawing Sheets

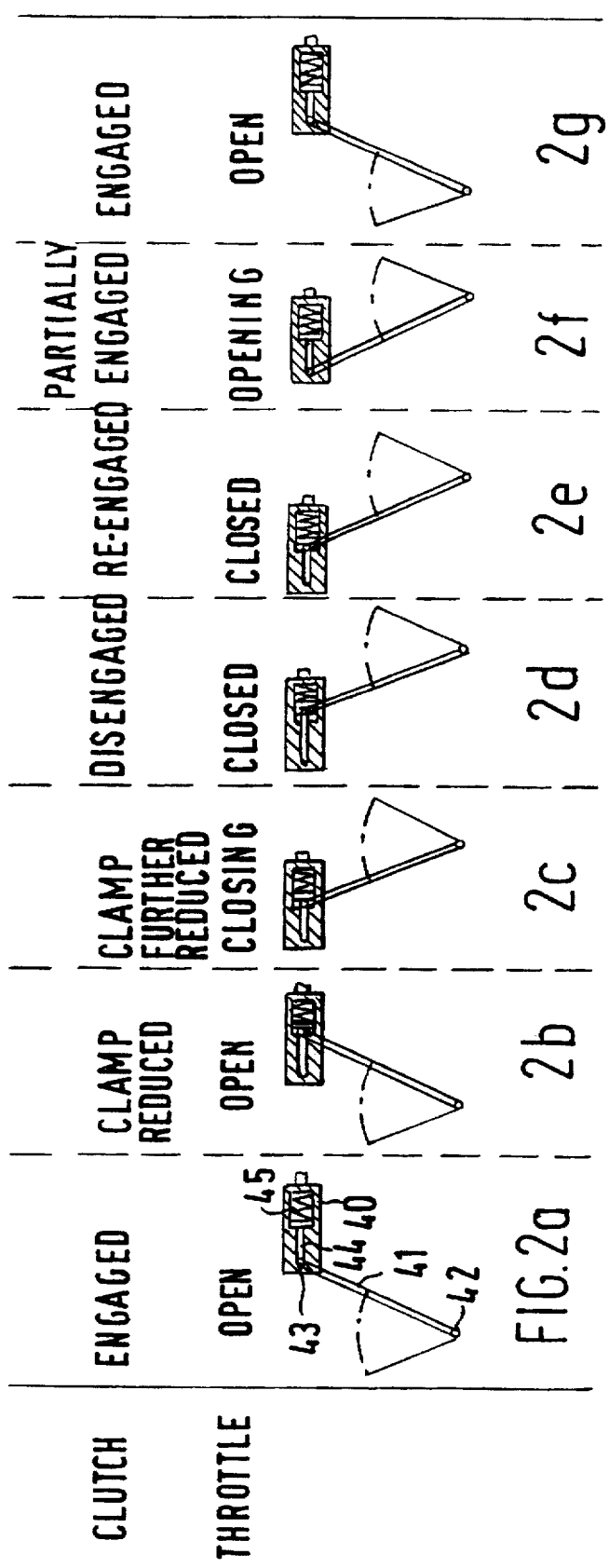
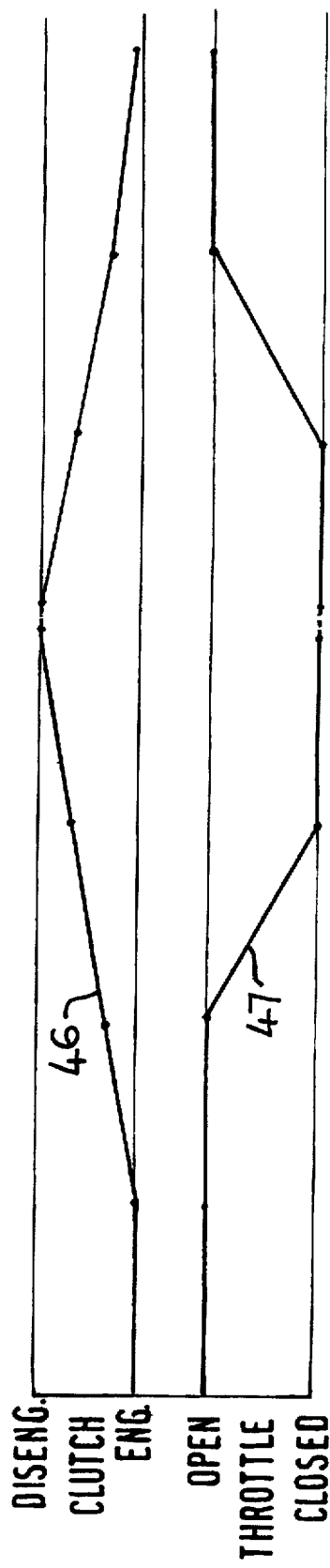

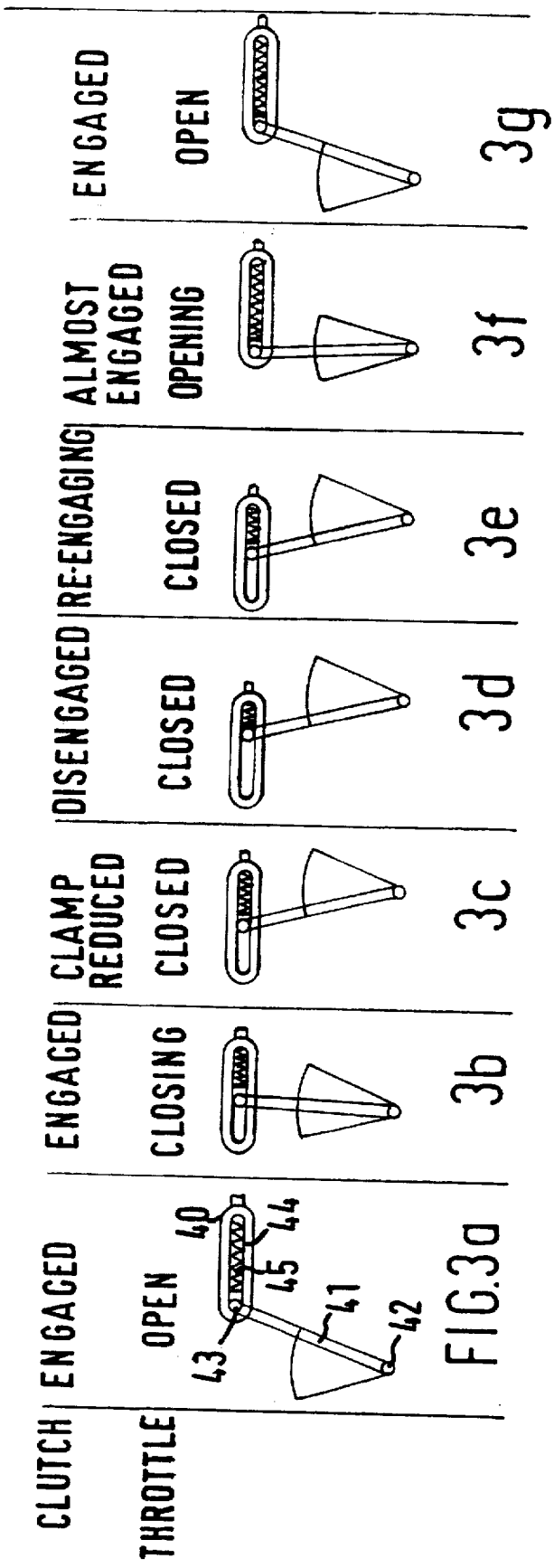
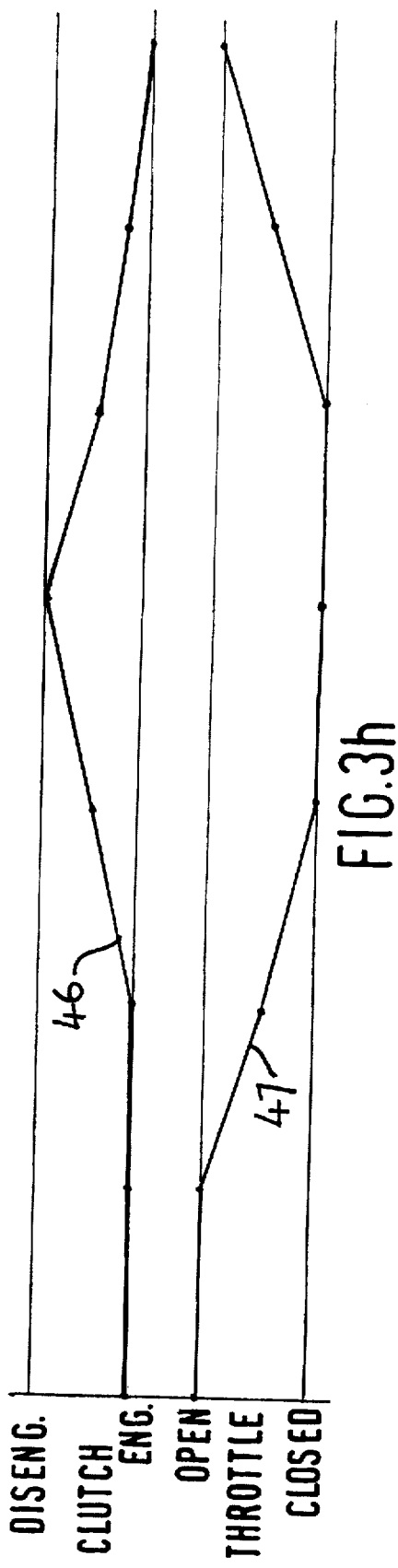

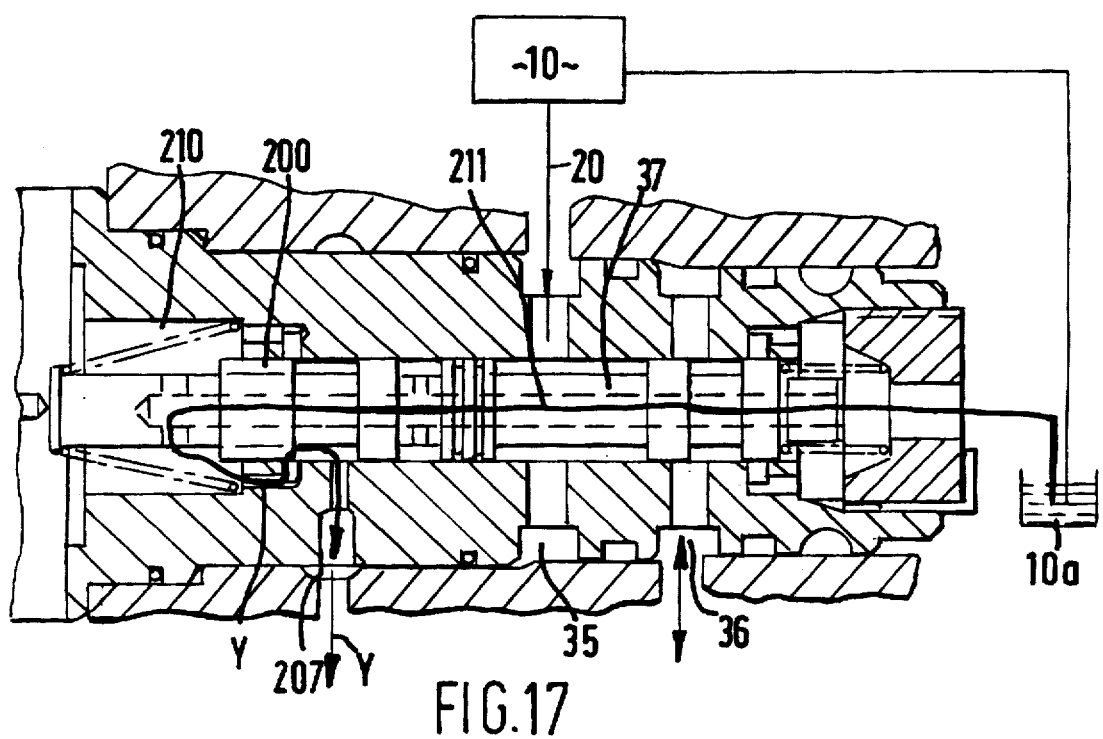
FIG.17
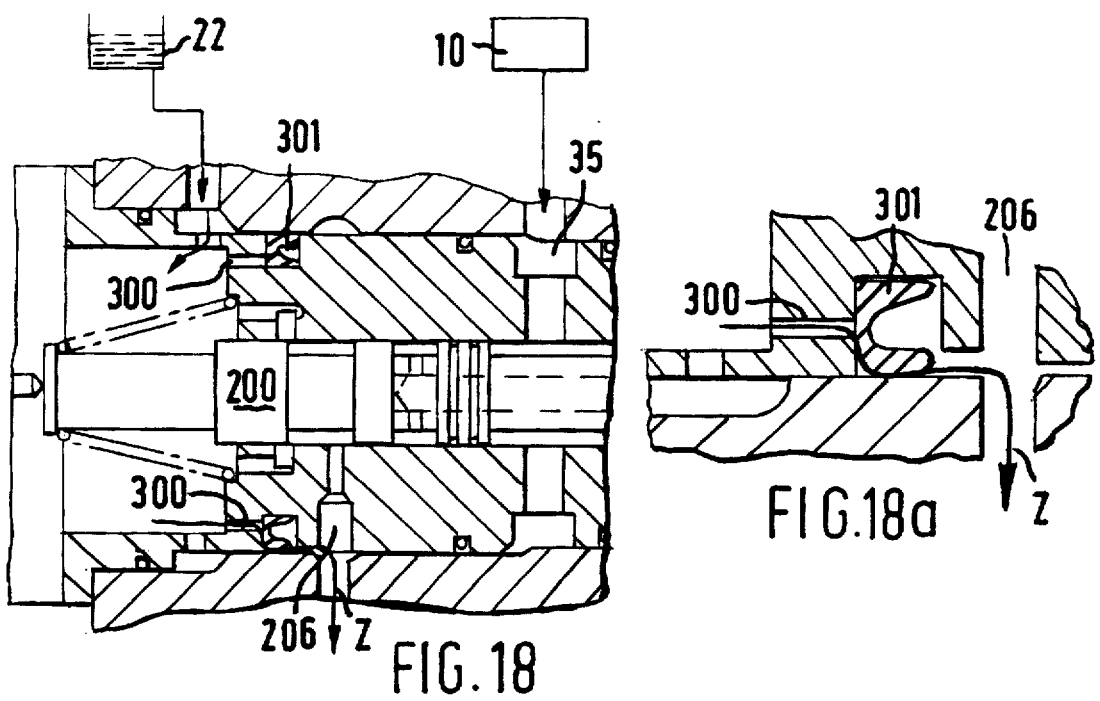
FIG.18
FIG.18a

ACTUATION SYSTEMS AND MECHANISMS

FIELD OF THE INVENTION

This invention relates to actuation systems and mechanisms and in particular, though not exclusively, to such actuation systems and mechanisms for the operation of vehicle clutches used in semi-automatic transmissions of the form described in, for example, the Applicants earlier European patents Nos. 0038113, 0043660, 0059035 and 0101220.

DESCRIPTION OF THE PRIOR ART

In such transmissions, in which the engagement and disengagement of the clutch is controlled by an electronic unit in response to operation of the throttle and gear selector lever by the vehicle driver, there is a need not only to operate the clutch under the control of the control unit but also to monitor the state of engagement of the clutch.

Typically clutch engagement is monitored by sensing the position of a clutch release lever which operates the release bearing of the clutch. This is normally achieved by using a slave cylinder to operate the clutch release bearing which also includes a cylinder travel sensor. This necessarily results in a significantly more bulky slave cylinder which is unique to the particular installation. Also certain installations are too crowded to allow the use of such a bulky slave cylinder.

SUMMARY OF THE INVENTION

It is an object of the present invention to provide an actuation system which is suitable for the operation of a clutch release lever and which allows the travel of the release lever to be monitored at a location remote from the lever.

Thus according to the present invention there is provided an actuation system comprising a source of pressurised fluid interconnected with a slave cylinder via a displacement means, said displacement means including a component which is displaced by the pressurised fluid from the source to provide a displacement proportional to the actuating movement of the slave cylinder caused by the pressurised fluid, and sensing means operable to measure said displacement to indicate the actuating movement of the slave.

As will be appreciated the slave cylinder of an actuation system as described above is suitable for the operation of a clutch release lever and the displacement valve and associated sensing means, which will provide the indication of the state of engagement of the clutch, may be located at any convenient position remote from the slave cylinder.

In one particularly convenient arrangement the source of pressurised fluid may comprise an hydraulic powerpack including an hydraulic reservoir, pump and accumulator, said displacement valve also being part of said powerpack. The Applicants earlier patent No. 0430943 describes a suitable form of powerpack.

The displacement means may comprise a piston axially slideable in a bore of the housing to define two fluid tight chambers one on each side of the piston, one chamber being connected with the slave cylinder and the other chamber being connected with the source of pressurised fluid, and a displacement member which moves with the piston and extends outside the housing for co-operation with the sensing means.

The displacement means may be in the form of a displacement valve with a passage interconnecting said chambers on each side of the piston, and a valve means disposed in said passage to cut-off or control the passage of fluid between said chambers and hence between said source and slave cylinder, said valve means being arranged to be open when said piston is in a retracted condition in which said other chamber is at a minimum volume and said slave cylinder is not operated and said valve means being arranged to close as said piston is displaced along said bore against a bias force in response to a rise in the pressure of said pressurised fluid thus raising the pressure level in said one chamber to cause actuating movement of the slave cylinder proportional to the movement of said piston.

Conveniently a rod may extend from one side of the piston along said bore through said one chamber and exiting from said housing, and sensing means in the form of a rotary or linear transducer may be connected with said rod to provide a signal output representative of the actuating movement of the slave cylinder.

The valve means which controls the passage of actuating fluid between the two chambers may comprise a check valve which is spring-loaded to a normally closed condition, said check valve being opened when said piston is in its retracted condition by pin means which contacts an end of the bore and unseats the check valve.

In accordance with a further aspect of the present invention there is also provided a displacement valve for use in an hydraulic actuation system, said displacement valve comprising a housing with a piston slideable in a bore of the housing to define two fluid tight chambers one on each side of the piston, one chamber being connected with the cylinder and the other chamber being connected with the source of pressurised fluid, a sensing means operatively connected with the piston, a passage interconnecting said chambers, and a valve means disposed in said passage to cut off or control the passage of fluid between said chambers and hence between said source and slave cylinder, said valve means being arranged to be open when said piston is in a retracted condition in which said other chamber is at a minimum volume and said slave cylinder is not operated and said valve means being arranged to close as said piston is displaced along said bore against a bias force in response to a rise in said pressurised fluid thus raising the pressure level in said one chamber to cause actuating movement of the slave cylinder proportional to the movement of said rod and which is measured by said sensing means.

In some semi-automatic transmissions the electronic control unit also reduces the throttle setting during gear changes to provide a smoother change (see for example, the Applicants earlier patents GB-B2210664, GB-B2233053 and their earlier application No. W093/00227.

The invention also provides a mechanism for interconnecting the operation of a vehicle clutch and throttle, said mechanism comprising a first linkage member moveable in a first direction in response to disengagement of the clutch and in a second direction in response to engagement of the clutch, a second linkage member connected with the vehicle throttle and moveable in said first direction to close the throttle, and in said second direction to open the throttle, and a lost motion connector connecting the first and second linkage members, said lost motion connection allowing initial movement of the first linkage member in the first and second directions without any corresponding movement of the second linkage member in said first and second directions.

The lost motion connection may also include a resilient means which provides the force transmitting path between the first and second linkage members for movement of the second linkage member in said first direction by the first linkage member.

In a preferred arrangement the rod of a displacement valve of the form described above comprises the first linkage member of the above mechanism.

The resilient means of the mechanism may be provided by a second piston within the rod or an extension thereof which is operatively connected with the second linkage member and is biased in said first direction by spring means.

The spring means of the mechanism may be a fixed rate spring (e.g. a coil spring) which provides a fixed phase relationship between the movement of the first and second linkage members in said first direction.

Alternatively the second piston defines a chamber within the rod which is connected with said one chamber to allow movement of the second piston within the rod dependent on the level of pressure in said one chamber to enable the phase relationship between the movement of the first and second linkage members in said first direction to be varied.

The rod of the displacement valve may also be used to operate a hill holder valve in an associated vehicle braking system.

The various aspects of the present invention will now be described, by way of example only, with reference to the accompanying drawings in which:

BRIEF DESCRIPTION OF THE DRAWINGS

FIGS. 2 and 2a–2h and FIGS. 3 and 3a–3h show various stages in the side engagement and re-engagement of a clutch and the opening and closing of an associated throttle using a mechanism in accordance with a further aspect of the present invention;

FIG. 17 shows part of the system of FIG. 16 with a common reservoir for its power pack and actuator;

FIGS. 18 and 18a show part of the system of FIG. 16 with an anti-cavitation feature.

DESCRIPTION OF THE PREFERRED EMBODIMENT

Figure 1:
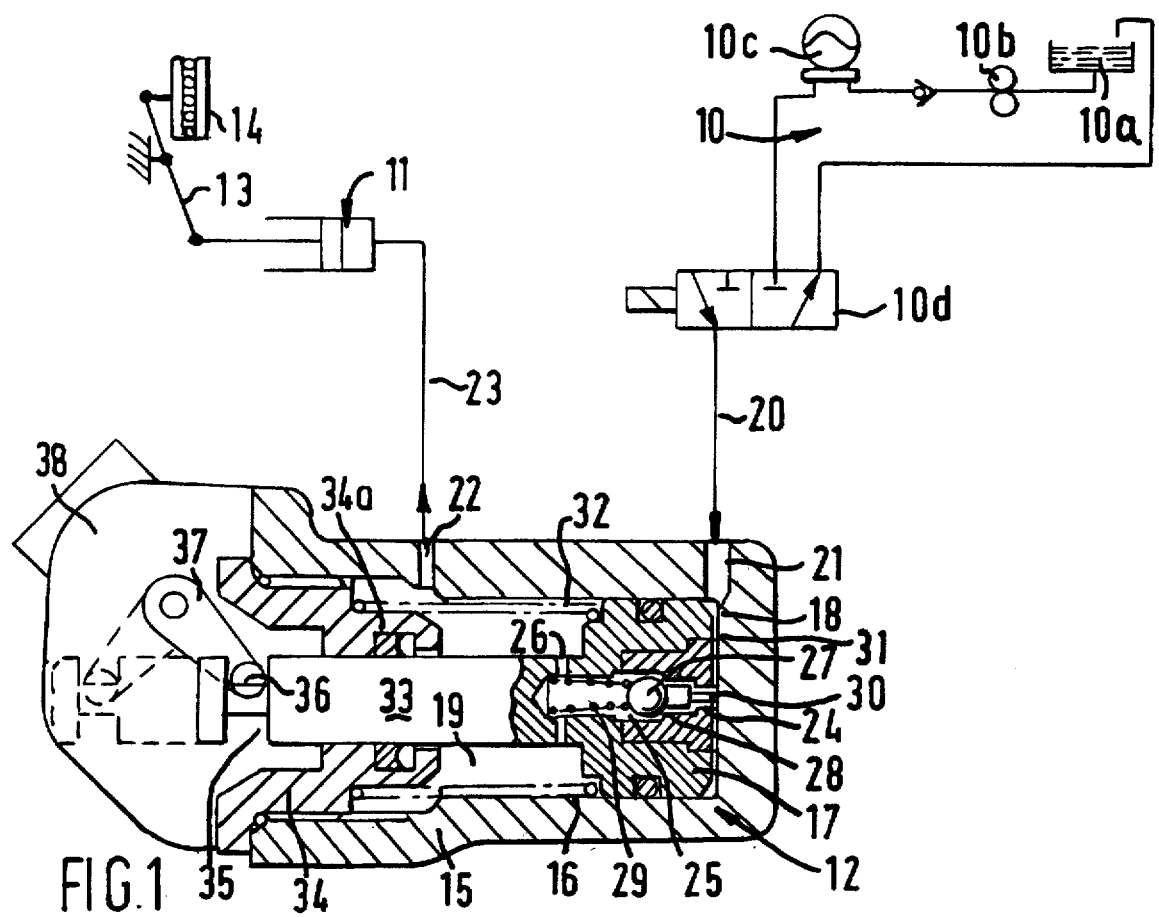
FIG. 1 shows a schematic diagram of an hydraulic actuation system according to the invention for the operation of a vehicle clutch.

Referring to FIG. 1, this shows a clutch actuation system in accordance with the present invention in which an hydraulic power pack 10 operates a clutch operating slave cylinder 11 via a displacement means in the form of a displacement valve 12. Powerpack 10 includes a fluid reservoir 10a, a pump 10b, an accumulator 10c and a solenoid operator fluid flow control valve 10d. Slave cylinder 11 acts on a clutch actuating lever 13 which in turn acts on a clutch release bearing 14.

Displacement valve 12 comprises a housing 15 having a bore 16 in which a piston 17 is axially slideable. Piston 17 divides the bore 16 into two fluid-tight chambers 18 and 19 on opposite sides of the piston. Chamber 18 is connected with the powerpack 10 via line 20 and inlet port 21, and chamber 19 is connected with slave cylinder 11 via outlet port 22 and line 23.

Piston 17 includes a passageway 24, 25, 26 through which fluid can pass from chamber 18 to chamber 19. The flow of fluid through this passageway is controlled by a ball valve 27 which is biased into contact with a valve seat 28 by a spring 29. When the piston 17 is in its fully retracted position shown in FIG. 1, ball valve 27 is unseated by a pin member 30 which is held captive within the piston and which abuts the end wall 31 of bore 16 when the piston is fully retracted. Piston 17 is biased towards its fully retracted position by compression spring 32.

Extending from piston 17 is a rod 33 which exits from the housing 15 via seals 34a carried by a screwthreaded end plug 34. Rod 33 is provided with a circumferentially extending groove 35 which is engaged by a pin 36 on an arm 37 of a rotary potentiometer 38 which is secured to the valve housing 15. Thus when piston 17 is displaced in bore 16 this moves rod 33 which in turn rotates the arm 37 of the potentiometer 38 to provide a potentiometer output proportional to the displacement of the piston 17.

The clutch actuating system described above operates as follows. To disengage the clutch, solenoid valve 10d is operated to connect pressurised fluid from accumulator 10c to line 20 which is fed to the inlet port 21 of the displacement valve 12. Initially the piston 17 is in the fully retracted position shown in FIG. 1 so that ball valve 27 is open.

Since both chambers 18 and 19 are subjected to the inlet pressure this pressure effectively acts on an end area of the piston 17 of a diameter equal to the external diameter of rod 33. This pressure is designed to displace piston 17 to the left, as viewed in FIG. 1, against the action of spring 32.

This causes the ball valve 27 to seat so that the inlet pressure then acts on the entire end of piston 17. The valve is designed so that the level of pressure necessary to move piston 17 to seat ball valve 27 against the action of spring 32 is very low and is insufficient to cause any actuating movement of the slave cylinder 11 which is connected to the hydraulic chamber 19. As the pressure in chamber 17 rises further, piston 17 is displaced axially along the bore 16 to expel fluid from chamber 19 and thus operate slave cylinder 11.

Due to the differential areas of chambers 18 and 19 the pressure in chamber 19 will be higher than that in chamber 18 and will thus help the spring 29 to maintain the ball valve 27 seated during operation of the displacement valve.

The connection of accumulator 10c to inlet port 21 causes axial displacement of piston 17 which in turn operates the slave 11 to disengage the clutch. The axial displacement of piston 17 which is proportional to the level of disengagement with the clutch is measured by potentiometer 38. Any movement of potentiometer 38 as a result of the initial movements of piston 17 necessary to seat ball valve 27 can be disregarded by any control system connected with potentiometer 38 so that the output of potentiometer 38 is a signal directly proportional to the state of engagement of the associated clutch.

A further advantage of the displacement valve construction is that once the ball valve 27 is seated the chambers 18 and 19 are isolated from each other so that the pressure levels generated in associated lines 20 and 23 are not communicated. It is therefore possible by suitable dimensioning of the piston 17, bore 16 and the diameter of rod 33 to adjust the pressures generated in the lines 20 and 23 to the level appropriate to the associated master and slave cylinders. Thus a master cylinder can be teamed with a slave cylinder for which its output pressure is not normally suitable by appropriate design of the intermediate displacement valve.

In addition to the operation, a clutch of the displacement valve 12 can also be used as part of a throttle closing mechanism which is used to reduce throttle openings during gear changing in semi-automatic transmissions of the type referred to above.

Figure 2:
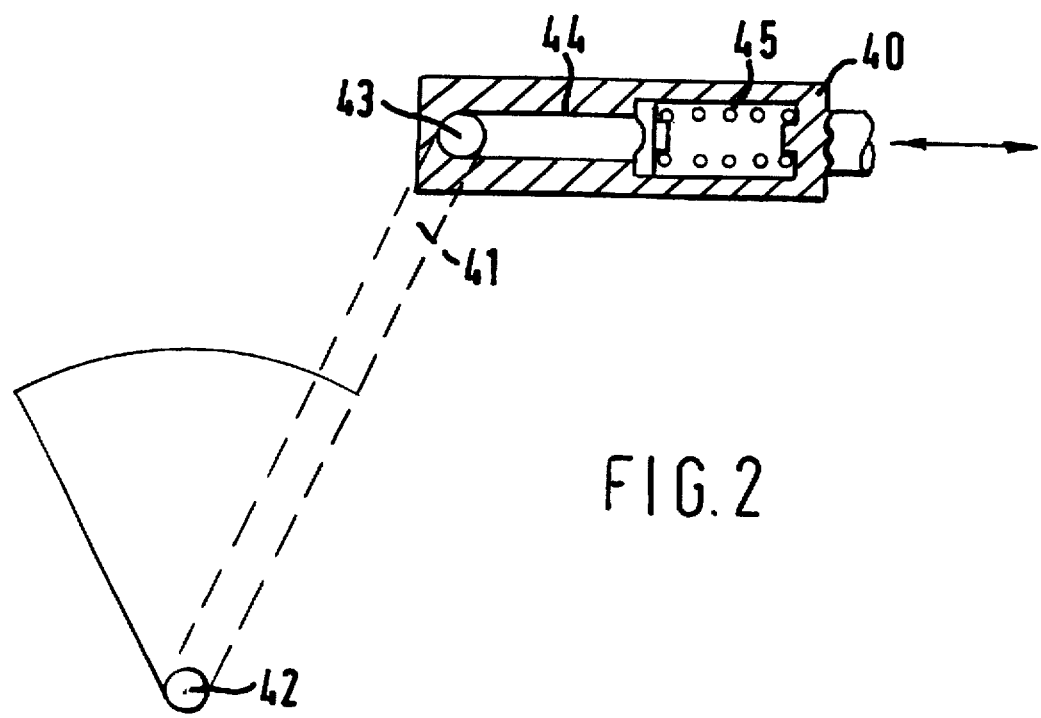

FIG. 2 shows in diagrammatic form part of a throttle closing mechanism which comprises a first linkage member 40 which is connected with the clutch operating mechanism and a second linkage member 41 which is connected with a throttle valve operating mechanism via a spindle 42. Second linkage member 41 is held in whatever position it is set by member 40 by a friction clamping arrangement (not shown) which may, for example, be associated with spindle 42. The first and second members are interconnected via a lost motion connection in the form of a pin 43 on linkage member 41 which engages in a slot 44 in linkage member 40. A compression spring 45 is disposed within and partially fills the slot 44 to co-operate with the pin 43 as will be described below.

FIGS. 2a through 2h shows various stages in the disengagement and re-engagement of a clutch and the opening and closing of an associated throttle by a mechanism of the form described above.

At FIG. 2a the mechanism is shown with the clutch engaged and the throttle open. At FIG. 2b the clutch clamping load has begun to reduce, thus displacing link 40 to the left from the FIG. 2a position whilst the throttle control link 41 still remains in the open position. As the linkage moves from the FIG. 2a to the FIG. 2b position the lost motion between the pin 43 and the compression spring 45 is taken up so that although the linkage member 40 connected to the clutch operating mechanism moves to the left there is no leftward movement of the pin 43.

At FIG. 2c the pin 43 is moved to the left by the further reduction in the clutch clamp load. This begins the compression of spring 45 and moves the throttle control linkage 41 in an anti-clockwise tense about spindle 43 thus closing the associated vehicle throttle valve.

At FIG. 2d the disengagement of the clutch is fully completed by additional compression of spring 45 whilst the throttle control linkage 41 is held in the closed position by friction clamping acting about spindle 42.

At FIG. 2e re-engagement of the clutch has commenced with the movement of linkage member 40 to the right as viewed in FIG. 2. This partially releases the compression of spring 45 whilst maintaining the throttle control linkage 41 held in the closed position.

At FIG. 2f the clutch has been further engaged so that the spring 45 is no longer compressed and the pin 43 has now taken up all the lost motion in the connection so that the pin occupies the extreme left hand end of slot 44 with the throttle valve just beginning to open.

At FIG. 2g the clutch is now fully re-engaged and the linkage member 40 has drawn the throttle linkage member 45 in an anti-clockwise sense about spindle 42 thus re-opening the throttle valve.

The various states of clutch disengagement and re-engagement and the throttle opening and closure are shown graphically in FIG. 2h with curve 46 representing the state of engagement of the clutch and curve 47 representing the throttle opening position.

Figure 3:
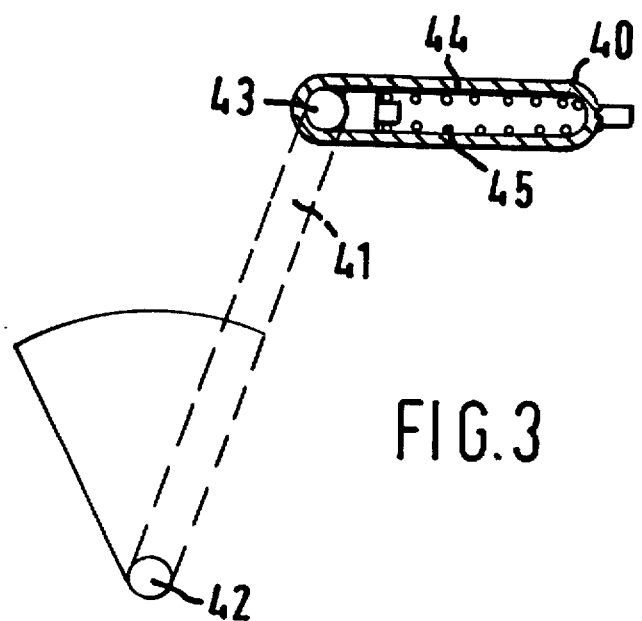

FIG. 3 shows a similar form of clutch and throttle operating linkage in which the spring 45 occupies the entire length of slot 44 so that at FIG. 3b reduction of the throttle setting begins earlier as a result of the immediate compression of spring 45 as soon as the linkage member 40 connected with the clutch operating mechanism begins to move. Again the lower half of FIG. 3 shows the clutch engagement and throttle opening positions for each of the stages in the disengagement and re-engagement of the clutch.

A clutch operating and throttle closing mechanism of the form described above in relation to FIG. 2 or FIG. 3 can conveniently be combined with a displacement valve 12 of the form shown in FIG. 1.

Figure 4:
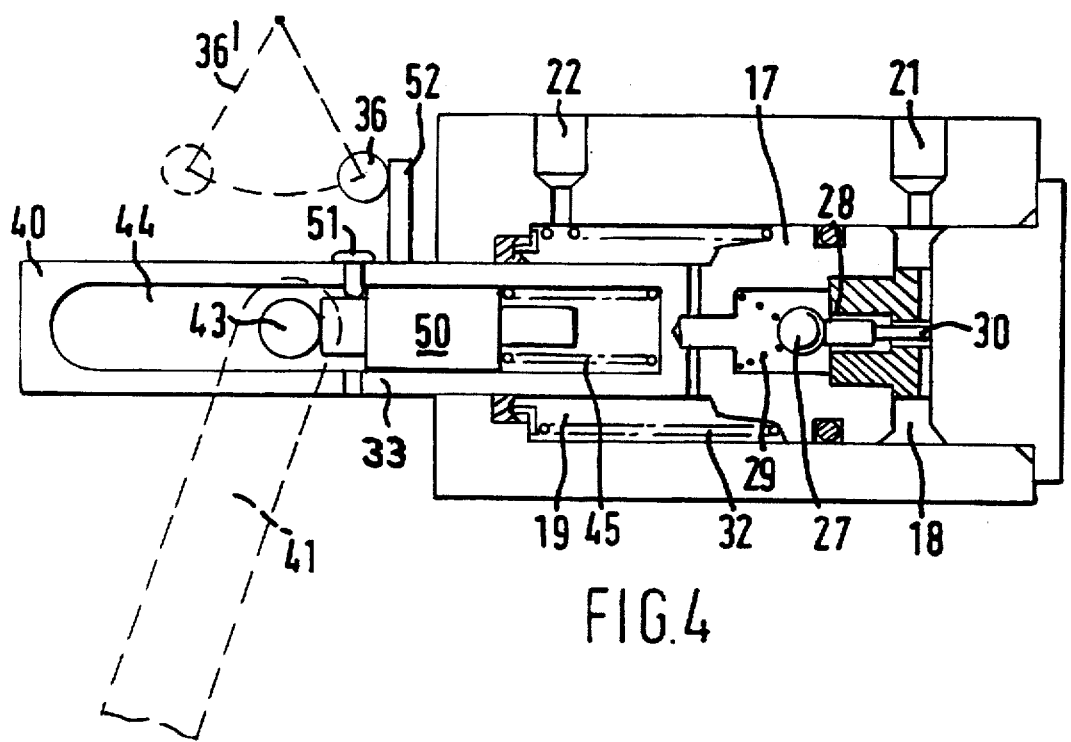
FIG. 4 shows a schematic section through a displacement valve in accordance with the invention which includes a lost motion connection with an associated throttle linkage.

FIG. 4 shows such a valve in which the rod 33 operates as the linkage member 40 which includes a slot 44 engaged by the pin 43 associated with the throttle control linkage 41. A compression spring 45 within slot 44 is acted upon for the right hand part of the travel of pin 43 via a plunger 50 whose travel to the left in slot 44 is limited by a pin 51.

A flange 52 on linkage member 40 is contacted by the roller or pin 36 of the associated rotary potentiometer whose arc of movement is indicated by dotted detail 36'.

The remainder of the construction shown in FIG. 4 is operationally as described previously with reference to FIG. 1 and will not therefore be described again. The clutch and throttle operating mechanism operates as described with relation to FIGS. 2a to 2h described above.

Figure 5:
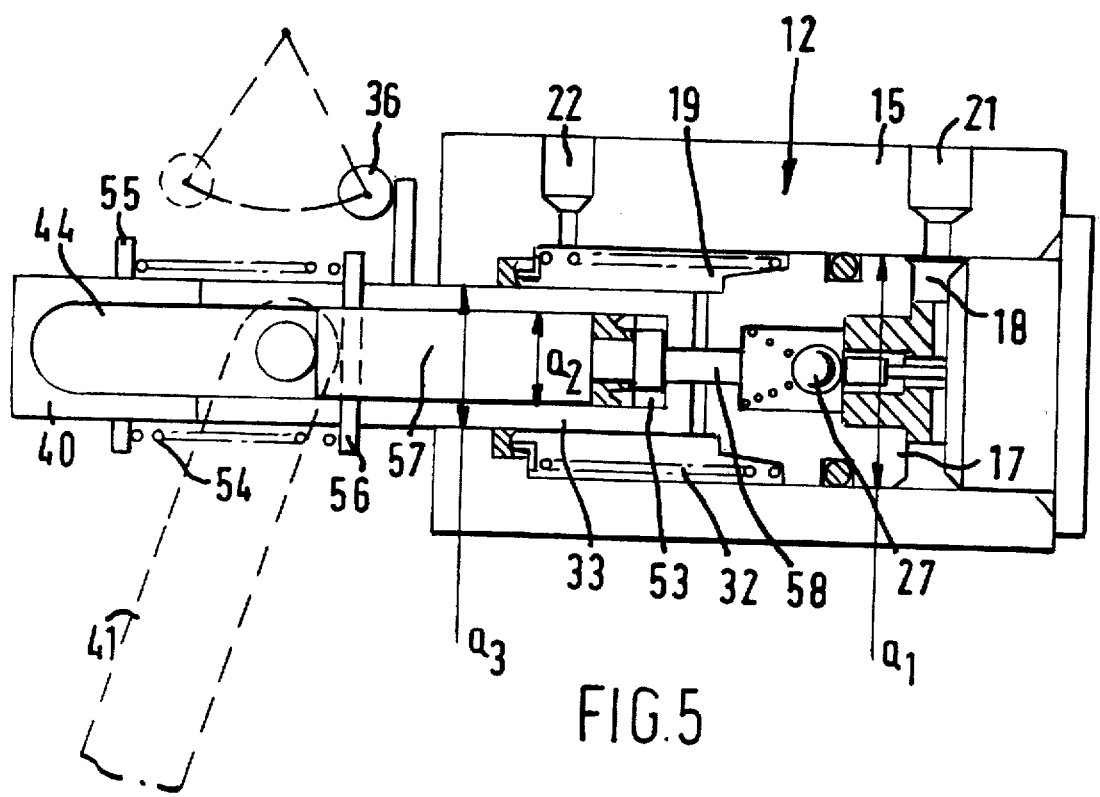
FIG. 5 and 6 show schematic sections through alternative forms of displacement valves with lost motion connections.

FIG. 5 shows a modified form of the arrangement shown in FIG. 4 in which a light spring 54 acts between an abutment 55 on the outside of member 40 and a crosspin 56 which extends through an internal piston 57 which defines a chamber 53 within rod 33 which communicates with hydraulic chamber 19 via drilling 58.

In the arrangement shown in FIG. 5, the position of piston 57 within member 40, and thus the amount of lost motion in the mechanism, is dependent on springs 32 and 54 and the ratio between the pressure areas a1, a2 and a3. Thus the phase relationship between the movement of linkage members 40 and 41 can be varied by suitable choice of springs 32, 54 and areas a1, a2, a3. The device shown in FIG. 5 again operates essentially as previously described with reference to FIGS. 3a to 3h.

The device shown in FIG. 4 can be made to reduce the throttle setting earlier by arranging the ball valve 27 to have a long cut-off travel so that piston 17 and rod 40 are moved to the left further (as viewed in FIG. 4) before the ball valve 27 seats thus advancing the moment at which plunger 50 is effective to operate member 41.

Figure 6:
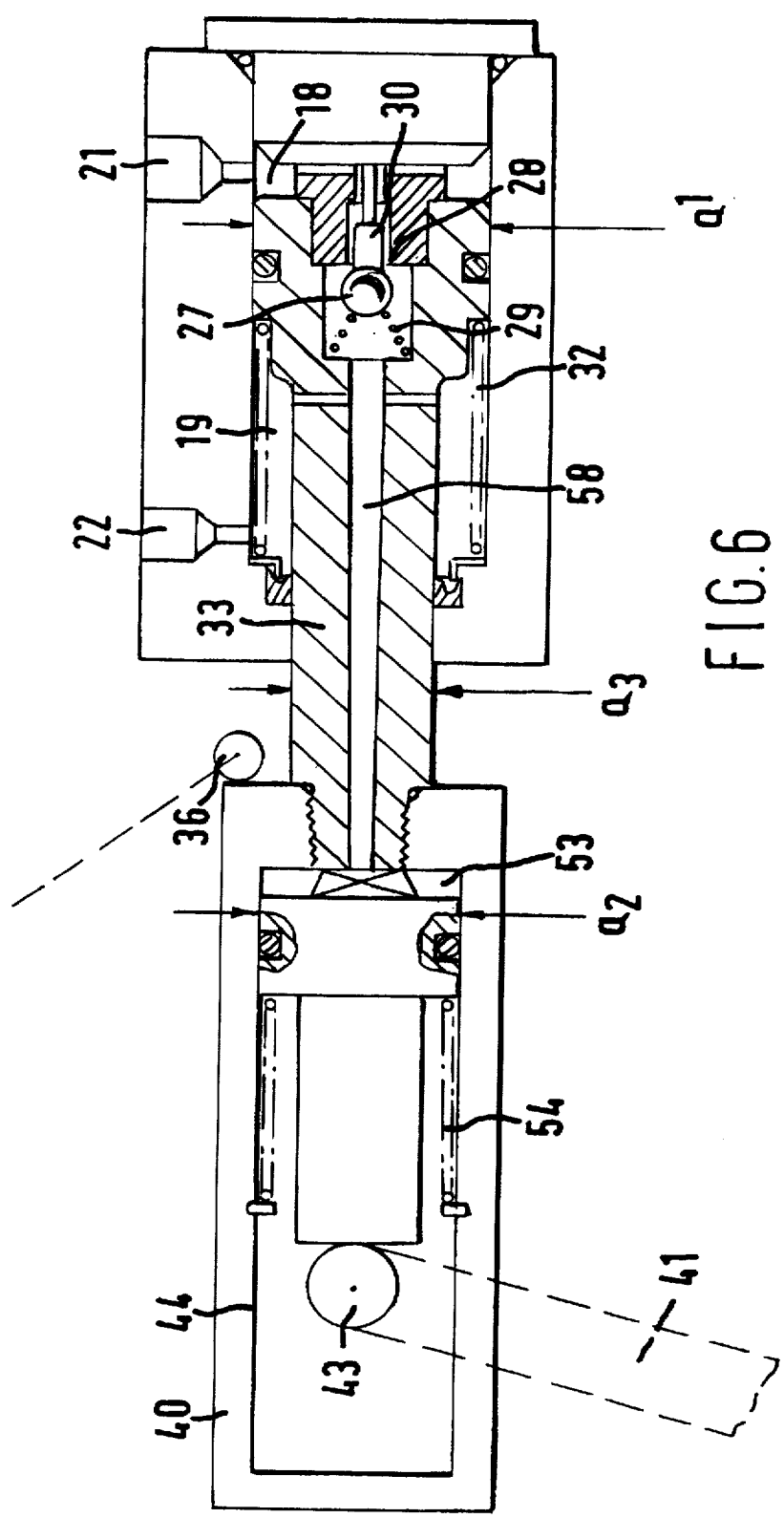

FIG. 6 shows a further form of the device shown in FIG. 5 in which the linkage member 40 is not formed within rod 33 but in an extension thereof. This mechanism although functionally identical to that shown in FIG. 5 is somewhat more bulky and cumbersome. Again the spring effect is dependent on the level of pressure within chamber 53 which is connected to chamber 19 by drilling 58. Those components in FIG. 6 whose function is equivalent to those shown in FIG. 5 have been similarly numbered.

Figure 7:
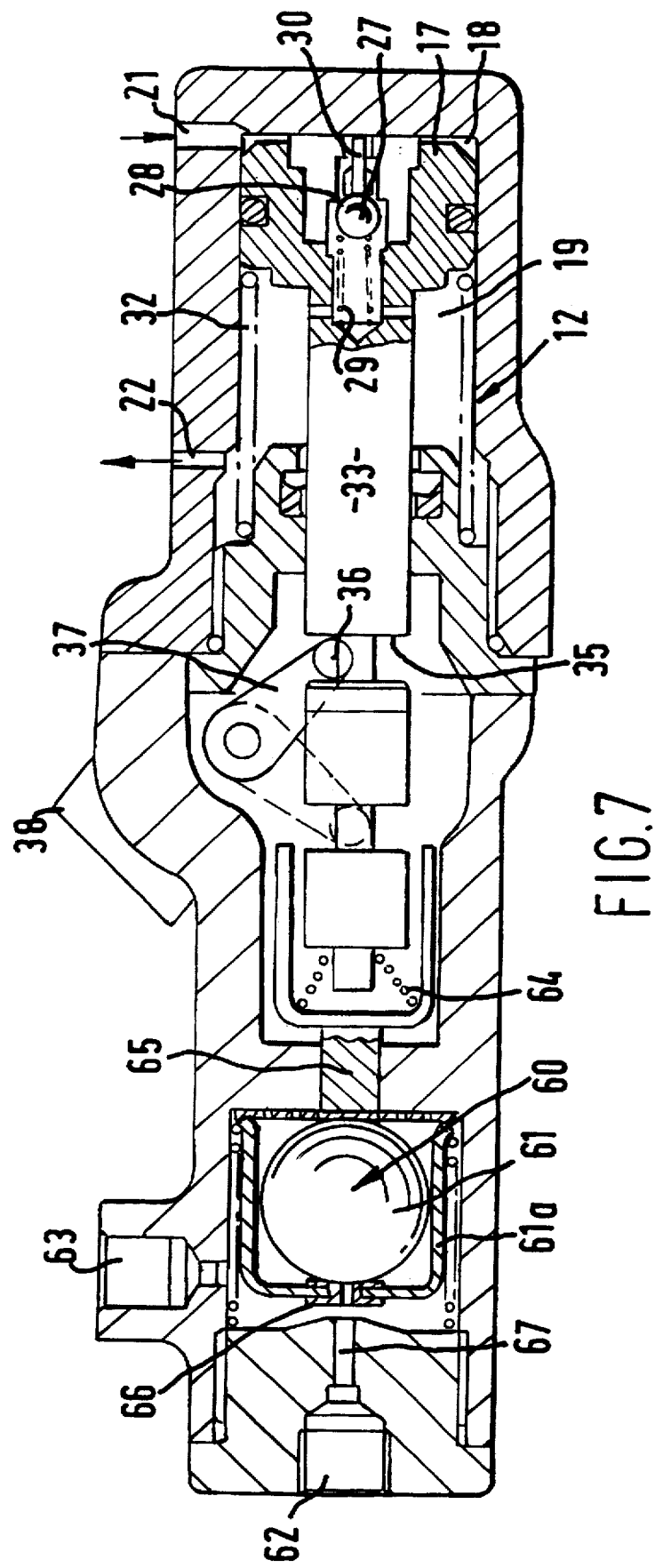
FIG. 7 shows a schematic section through a displacement valve, potentiometer and hill holding valve combination.

Yet a further form of the present invention is shown in FIG. 7 in which the displacement valve 12 of FIG. 1 is connected with a hill holding valve 60 of the same general form of that described in the Applicants earlier pending patent application No. WO93/16903.

The hill holding valve 60 essentially comprises a ball valve member 61 within a cage 61a which can be actuated to close off communication between an inlet port 62 and an outlet port 63 which are plumbed into the brake system of the associated vehicle. Thus when the clutch begins to be disengaged and the rod 33 begins to move to the left, the rod operates via spring 64 on a pin member 65 which displaces cage 61a to bring an annular seal 66 on the cage into contact around a port 67 connected to inlet 62. If the vehicle is on a hill, ball valve 61 will then roll into contact with seal 66 thus cutting off communication between inlet 62 and outlet 63 and holding any pressure in the brake system on the outlet side of ball valve 61.

This hill holder valve 60 thus ensures that when the clutch is disengaged on a hill any brake pressure generated by application of the brake is retained by the ball valve 61 so that the vehicle operator can remove his foot from the brake pedal to operate the accelerator without risk of rolling backwards.

It will be appreciated that the hill holder arrangement shown in FIG. 7 could also be combined with the clutch operating arrangements shown in FIGS. 2 to 6 to provide an arrangement in which the clutch, throttle and hill holder are all operated from the displacement valve.

Also, the clutch and throttle operating linkages diagrammatically illustrated in FIGS. 2 and 3 can be used with the linkage member 40 operated by a device other than the displacement valve arrangements of the present invention.

Figure 8:
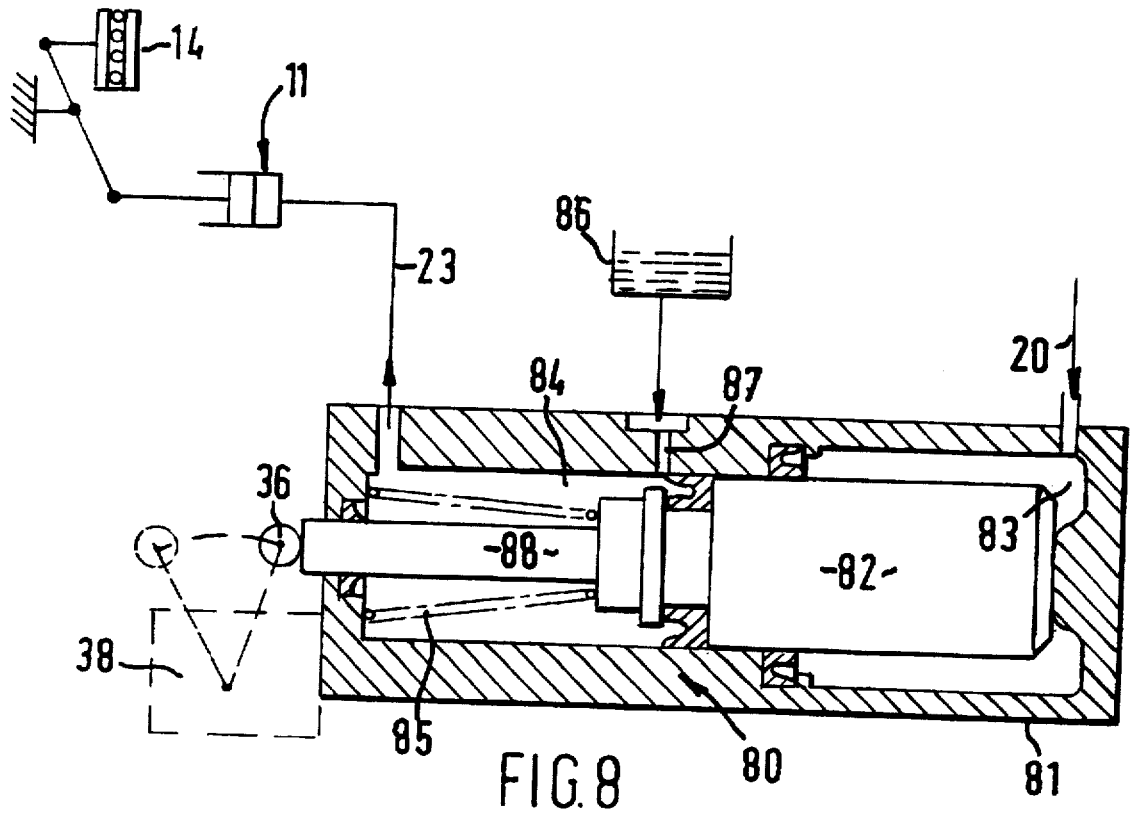
FIG. 8 is a schematic diagram of an alternative form of hydraulic displacement means in accordance with the invention.

FIG. 8 shows a simplified form of hydraulic displacement means 80 which can be used in place of the various forms of displacement valve 12 described above. Displacement means 80 comprises a housing 81 within which a piston 82 is slideable to define two chambers 83 and 84 on opposite sides of the piston. Chamber 83 is connected with power-pack 10 and chamber 84 with slave cylinder 11.

Piston 82 is biased to its retracted position (shown in FIG. 8) by a compression spring 85. When in its retracted position chamber 84 communicates with a reservoir 86 via a recuperation port 87. A rod 88 extends from piston 82 down chamber 84 and exits from the housing where it is contacted by pin 36 of potentiometer 38.

When chamber 83 is pressurised by the powerpack, piston 82 is displaced to the left and expels fluid from chamber 84 to operate slave cylinder 11. The movement of piston 82 is communicated to potentiometer 38 via rod 88.

Figure 9:
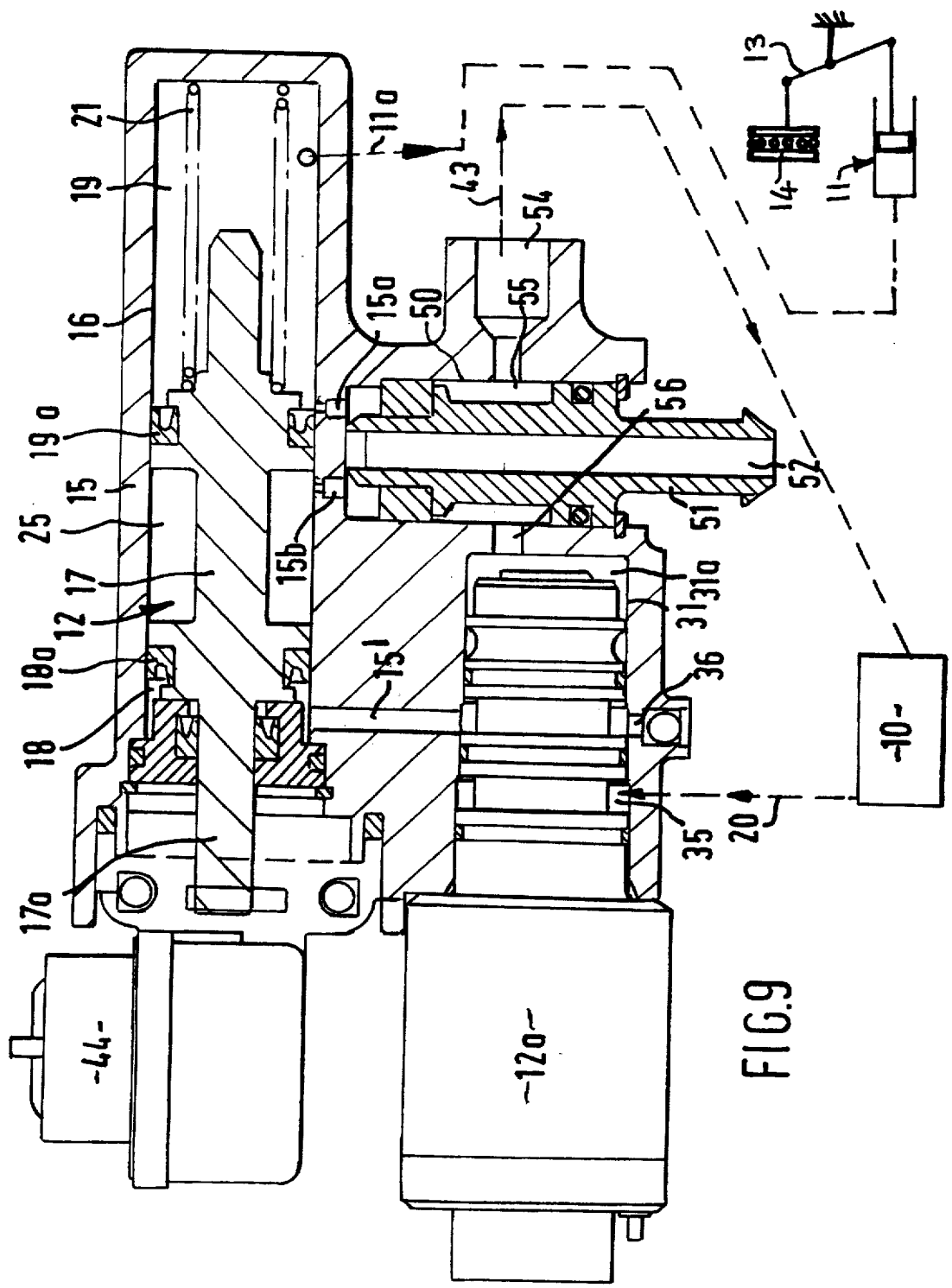
FIG. 9 a further form of actuation system in accordance with the invention in which the displacement valve and solenoid control valve are formed as an integral unit.
Figure 10:
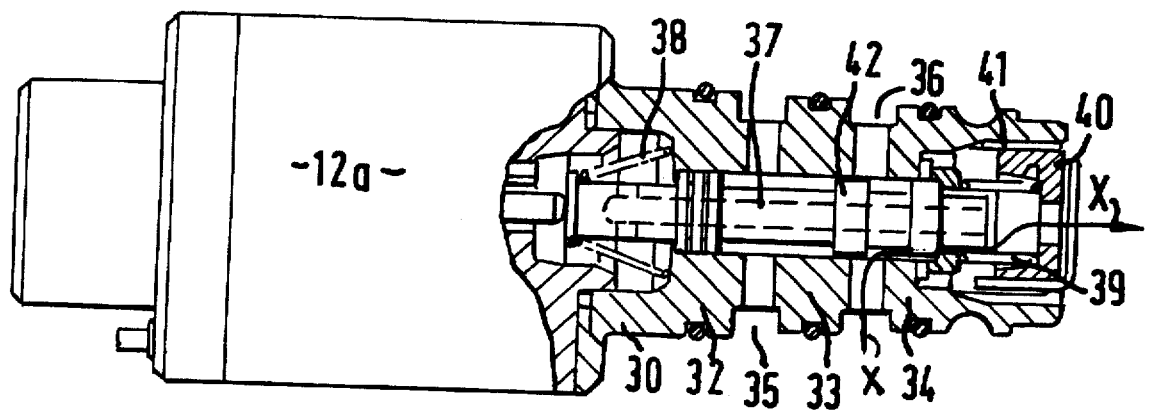
FIG. 10 shows in more detail the solenoid valve of FIG. 9.

FIGS. 9 and 10 show a displacement means in the form of an actuator 12 which is supplied with pressurised hydraulic fluid from a power pack 10 via a line 20. As in previously described arrangements the actuator is connected with a slave cylinder 11 by a line 11a. Slave cylinder 11 operates a clutch release bearing 14 via a lever 13. A solenoid-operated fluid flow control valve 12a controls the flow of pressurized fluid to and exhaust of pressurised fluid from the actuator 12.

The actuator 12 again comprises a piston 17 which slides in a bore 16 of housing 15 and which divides the bore into two fluid type chambers 18 and 19 using seals 18a and 19a respectively. Between the seals there is provided a space 25 which is filled with hydraulic fluid.

Piston 17 is biased to its clutch engaged position by return spring 21 and is connected with rotary potentiometer 44 at its end 17a.

Housing 15 is provided with recuperation drillings 15a and 15b which communicate with chamber 19 and space 25 respectively an open into a bore 50 provided in housing 15. Within housing bore 50 is retained a spigot 51 having a central drilling 52 which communicates with recuperation drillings 15a and 15b. Spigot 51 is in turn connected by suitable piping to a recuperation reservoir (not shown). Housing 15 also includes a return port 54 which is in communication with an annular chamber 55 which surrounds spigot 51 and which communicates via drilling 56 with the end 31 of the bore which houses the solenoid valve 12a. In this manner the return of fluid from chamber 18 is channeled from chamber 31a via drilling 56, chamber 55, and return port 54 to return line 43 and hence back to power pack 10.

The internal details of solenoid valve 12a are shown in more detail in FIG. 10 from which it can be seen that an outer portion 30 of the valve is inserted into a bore 31 of the housing 15 and remains stationary therein. The outer portion 30 includes lands 32, 33 and 34 which make sealed contact with the bore 31 to define annular feed passages 35 and 36 which are connected with power pack 10 and chamber 18 (via drilling 15') respectively.

Within outer portion 30 of solenoid valve 12a is disposed an axially movable landed spool 37 which, when the solenoid valve 12a is not actuated, is maintained in the position shown in FIG. 10 by return springs 38 and 39 respectively. Return spring 39 reacts against a threaded nut 40 whose axial position within a threaded bore 41 controls the spring loading on spool 37 as described in the applicants co-pending application UK no 9308539.7.

With the spool 37 in the FIG. 10 position, spool land 42 cuts off communication between annular feed passage 35 and passage 36 connected with chamber 18 so that chamber 18 is not pressurised by the power pack 10. In this spool position feed passage 36 communicates with the end chamber 31a of bore 31 by the path X shown in FIG. 10. Chamber 31a is connected with a return line 43 which feeds fluid back to power pack 10.

Axial movement of piston 17 is communicated to a sensor 44 in the form of a rotary potentiometer via a pin 45 which extends through an actuating arm (not shown) of the potentiometer and the end 17a of the piston. Thus axial movement of piston 17 caused by variation of the hydraulic pressure in chamber 18 results in rotation of the potentiometer actuating arm thus giving a corresponding signal indicative of the position of piston 17 and hence the position of the associated clutch release bearing 14.

With the solenoid valve 12a in the non-actuating position shown in FIG. 10, the chamber 18 is connected with return line 43 via path X as described above so that the clutch operated by release bearing 14 is engaged. To dis-engage the clutch solenoid valve 12a is actuated to disconnect chamber 18 from return line 43 and connect this chamber with power pack 10 via grooves 35 and 36 as described above. This connection of chamber 18 with power pack 10 results in displacement of piston 17 to the right, as viewed in FIG. 9, which in turn displaces fluid from chamber 19 to operate slave cylinder 11 to disengage the associated clutch via thrust bearing 14.

As previously indicated, this movement of piston 18 results in movement of the actuating arm of rotary potentiometer 44 to provide a signal indicative of the new position of slave 11 and hence the state of disengagement of the associated clutch.

It will be appreciated that the rotary sensor 44 used in FIG. 9 and the earlier described displacement means can be replaced by any suitable form of linear sensor if so desired.

Figure 13:
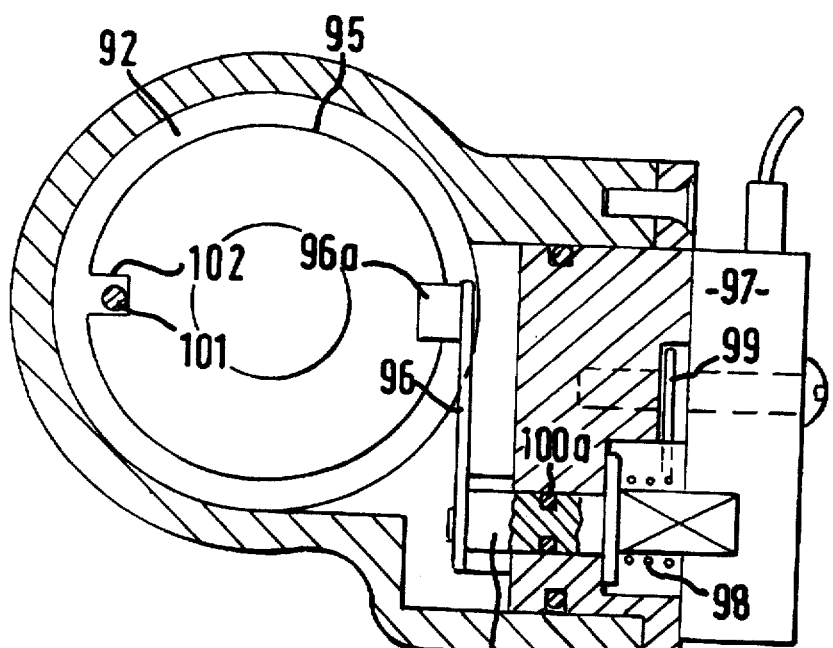
FIG. 13 shows a sectional view on line 13—13 of FIG. 12.
Figure 11:
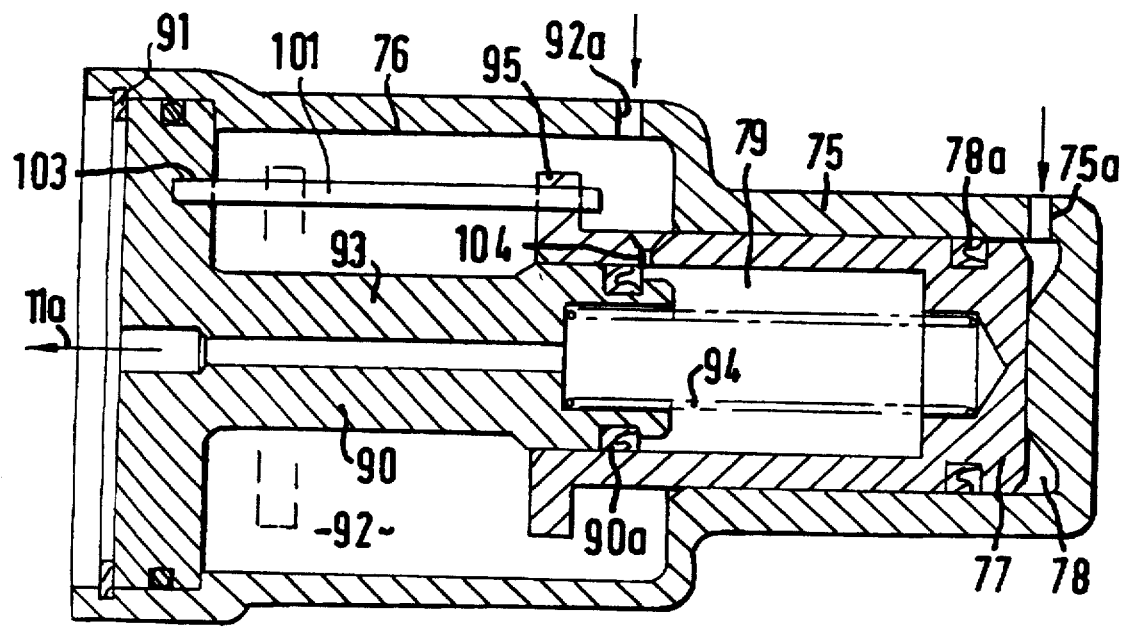
FIGS. 11 and 12 show a still further form of displacement means in accordance with the invention.
Figure 12:
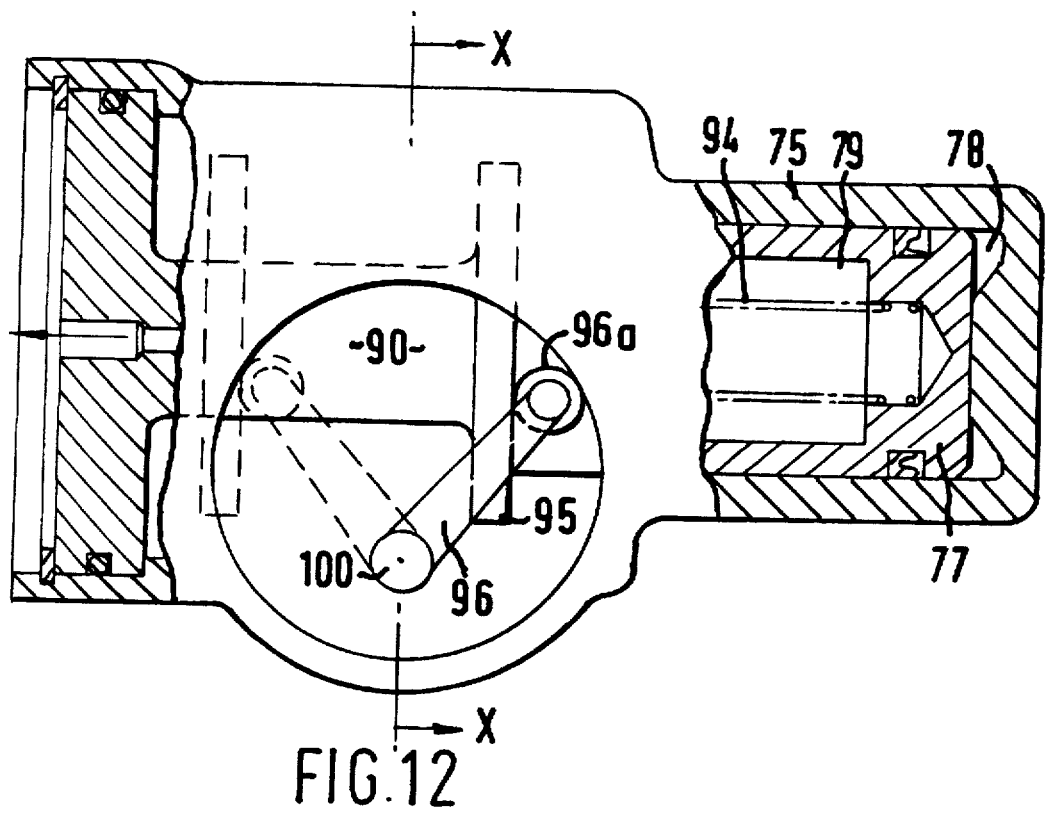

FIGS. 11 to 13 show an alternative actuator construction which is significantly shorter in axial length. In FIG. 11, the actuator has a body 75 having a stepped bore 76 within which a piston 77 is slidable. Piston 77 makes sealing contact with bore 76 and also with a fixed piston member 90 which is held in sealing engagement in bore 76 by a circlip 91. Seals 78a and 90a define chambers 78 and 79 and a reservoir 92 which surrounds fixed piston member 90.

Chamber 78 is connected via port 75a with a solenoid control valve (not shown) similar to 12a described above whilst chamber 79 is connected with slave cylinder 11 via drilling 93 which extends down the centre of fixed piston 90. Piston 77 is biased to the position shown in FIG. 11 by return spring 94. A flange 95 is provided on piston 77 against which a roller 96a carried on an arm 96 of an associated rotary potentiometer 97 acts. A return spring 98 having one end 99 braced against the housing 75 and the other engaging shaft 100 of potentiometer 97 provides the necessary bias force to maintain the roller 96a against flange 95. The exit of shaft 100 through housing 75 is sealed by seal 100a to prevent loss of fluid from reservoir 92. Rotation of piston 77 within bore 76 is prevented by a pin 101 which engages a cut-out 102 in flange 95 and a drilling 103 in fixed piston member 90.

As will be appreciated from the above, when the associated clutch is in an engaged position the piston 77 is as shown in FIG. 11. To disengage the clutch pressurised fluid is admitted to chamber 78 under the control of the associated solenoid valve, which displaces the piston 77 axially within bore 76 which in turn expels fluid from chamber 79 via drilling 93 to operate slave cylinder 11. A recuperation port 104 is provided in piston 77 through which fluid can replenish chamber 79 when the piston is in the fully retracted position. This replenishing fluid comes from reservoir 92 which surrounds piston member 90. Reservoir 92 may be of sufficient capacity to provide the total replenishment capability for the actuator. Alternatively, an external reservoir (not shown) may be connected with reservoir 92 via port 92a to increase replenishment capacity.

Figure 14:
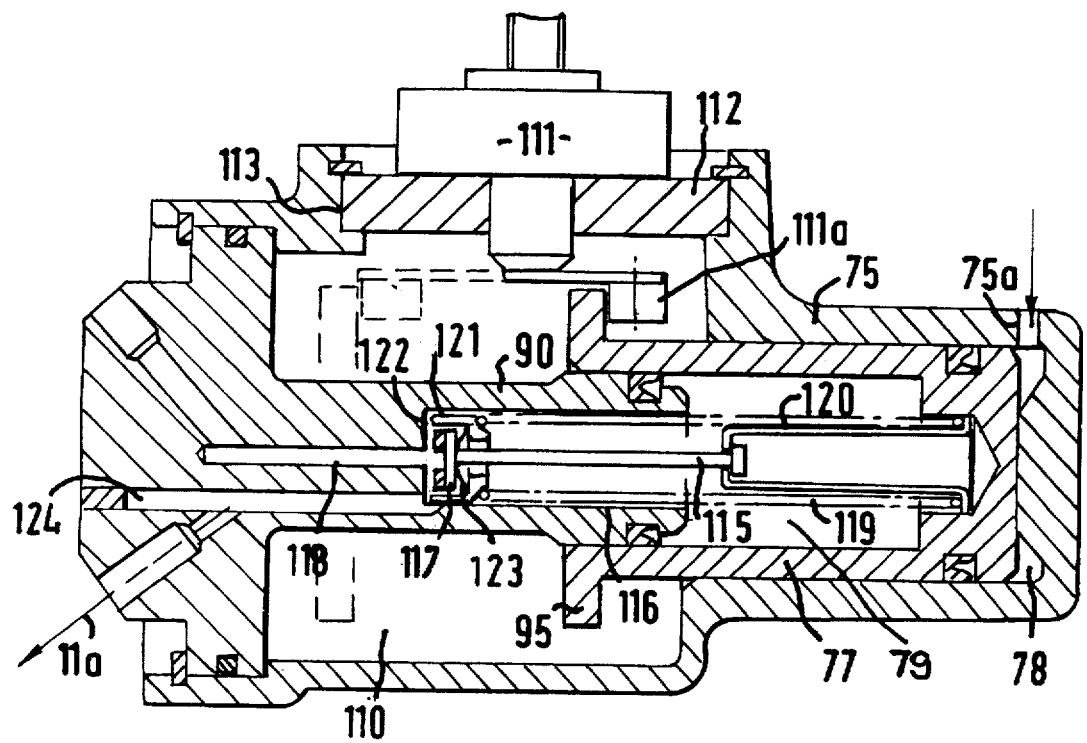
FIG. 14 shows section details of a still further form of actuator in accordance with the present invention.

FIG. 14 shows a further alternative form of actuator in which a piston 77 again slides within housing 75 over a fixed piston member 90 to define chambers 78 and 79 which are connected with power pack 10 and slave 11 respectively.

In the arrangement shown in FIG. 14 the flange 95 on piston 77 moves in a chamber 110 which surrounds fixed piston member 90 and which is not filled with hydraulic fluid. This dry chamber 110 is possible because of the alternative replenishing arrangements built into the centre of fixed piston member 90. This means that rotary potentiometer 111 which is supported on a mounting member 112 in a bore 113 of the housing is not required to be sealed against possible fluid ingress. Potentiometer 111 has a roller 111a which contacts flange 95.

Figure 15:
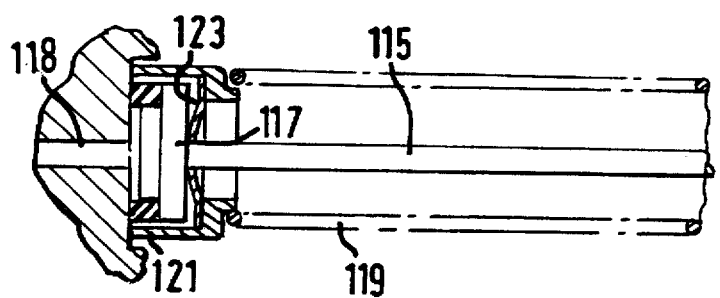
FIG. 15 shows details of a replenishing valve used in the actuator of FIG. 14.

The replenishing arrangements for chamber 79, part of which are shown on a larger scale of FIG. 15, are as follows. A valve member 115 extends within a bore 116 in fixed piston member 90 and has a head 117 which is capable of co-operating with and closing off a replenishing port 118 connected with a replenishing reservoir (not shown). When the actuator is in the clutch engaged position shown in FIG. 14, valve member 115 is biased out of contact with the end of replenishing port 118 by a return spring 119 which not only acts on piston 77 but also on valve member 115 via a spring cup member 120. Surrounding the head 117 of valve member 115 is a further spring cup 121 which is maintained in contact with the end 122 of drilling 116 by spring 119.

Between head 117 and cup 121 is a leaf spring member 123 which is maintained in a compressed condition when the clutch is engaged and the piston 77 is in the position shown in FIG. 14 in which port 118 is open.

When it is desired to disengage the clutch, fluid pressure is admitted to chamber 78 which in turn displaces piston 77 and expels fluid from chamber 79 to the slave 11 via outlet 124. The initial movement of piston 77 to the left as viewed in FIG. 14 relaxes the force applied to valve member 115 via cup 120 sufficiently to allow the leaf spring member 123 to displace the valve head 117 to the left relative to cup 121 sufficiently to close off the replenishing port 118 (see FIG. 15) so that the fluid expelled from chamber 79 leaves the actuator via drilling 116 and outlet 124.

The arrangement described above with reference to FIGS. 9 and 10 suffers from a number of shortcomings, in particular that the actuator cannot begin to generate pressure to operate the slave 11 until the communication with the reservoir via port 15a is cut-off and this cannot occur until significant axial displacement of piston 17 has occurred. Also, there is a time delay between the operation of solenoid valve 12a and the commencement of the movement of piston 17. These two factors combine to produce a relatively slow response in the operation of slave 11 and also extend the necessary axial length of the actuator 12 due to the movement necessary to cut-off the recuperation flow to chamber 19.

Figure 16:
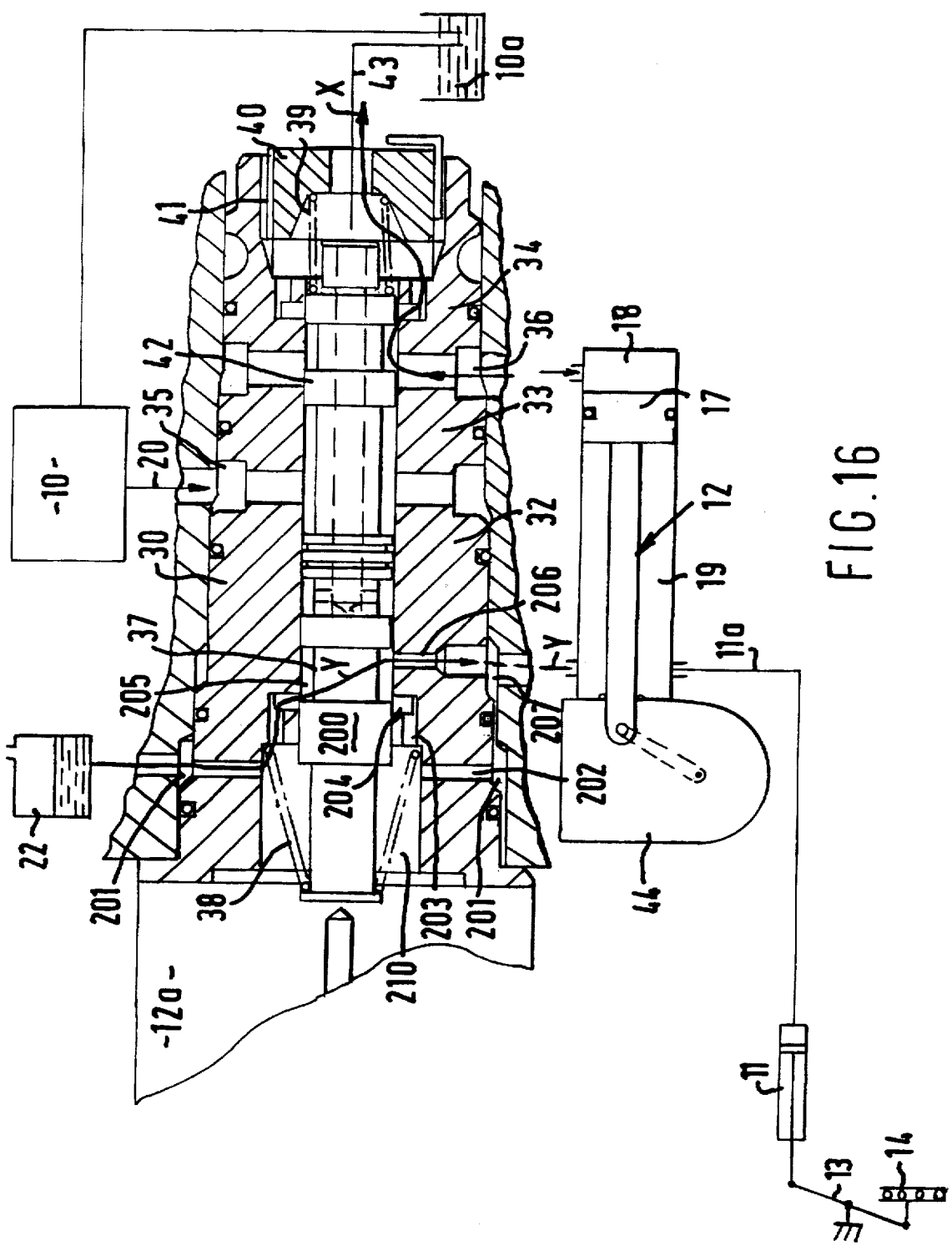
FIG. 16 shows a still further form of actuation system embodying the present invention which has separate reservoirs for the associated power pack and actuator.

FIG. 16 discloses an improved arrangement in which the cut-off in communication between the recuperation reservoir 22 and the chamber 19 effected by the provision of an extra land 200 on the spool 37 of the solenoid-operated valve 12a.

With the solenoid valve in the deactivated position shown in FIG. 16, chamber 19 of actuator 12 is connected with reservoir 22 via an annular groove 201, radial drillings 202, chamber 210, axial drillings 203, groove 204, spool portion 205, drilling 206 and annular groove 207. This recuperation communication is indicated by arrow Y in FIG. 16.

Also with the solenoid spool in the FIG. 16 position the powerpack 10, which is connected with feed passage 35, is isolated by land 42 from chamber 18 which is connected with feed passage 36. Chamber 18 is connected with reservoir 10a of powerpack 10 via a path X so that chamber 18 is not pressurised.

When solenoid valve 12a is operated to initiate movement of actuator 12, the initial movement of the spool 37 of the valve causes land 200 to close-off recuperation path Y so that pressurization can immediately begin to build up in chamber 19 which is in communication with slave 11. Further movement of the solenoid spool 37 causes land 42 to close-off return path X and connect feed passage 35 with feed passage 36 thus commencing presurisation of chamber 18.

As in the previous constructions, described pressurisation of chamber 18 displaces piston 17 which in turn operates slave 11. An indication as to the axial position of piston 17 and hence the position of the clutch release bearing 14 operated by slave 11 is given by a sensor in the form of a rotary or linear potentiometer 44 which is connected with piston 17.

FIG. 17 shows part of a similar arrangement to FIG. 16 but with the separate recuperation reservoir 22 deleted and the chamber 210 to which the separate reservoir 22 was previously connected being connected with the powerpack reservoir 10a via a drilling 211 down the centre of valve spool 37. Thus, as in the FIG. 16 construction, the recuperation path Y is open when the solenoid is deactivated and is immediately closed on initial movement if the spool 37 as described above. The other constructional details of the FIG. 17 construction are the same as those of FIG. 16.

FIGS. 18 and 18a show part of an actuator of the form shown in FIG. 16 with the addition of anti-cavitation passages 300 controlled by seal 301 which allow fluid to be drawn past seal 301 into chamber 19 via path Z in the event of rapid return of piston 17 thus helping to reduce the likelihood of cavitation occurring in chamber 19 or the connection with slave 11. It will be appreciated that the anti-cavitation feature described above in relation to FIG. 18 & 18a can also be used in a single reservoir arrangement of the form shown in FIG. 17.

Figure 19:
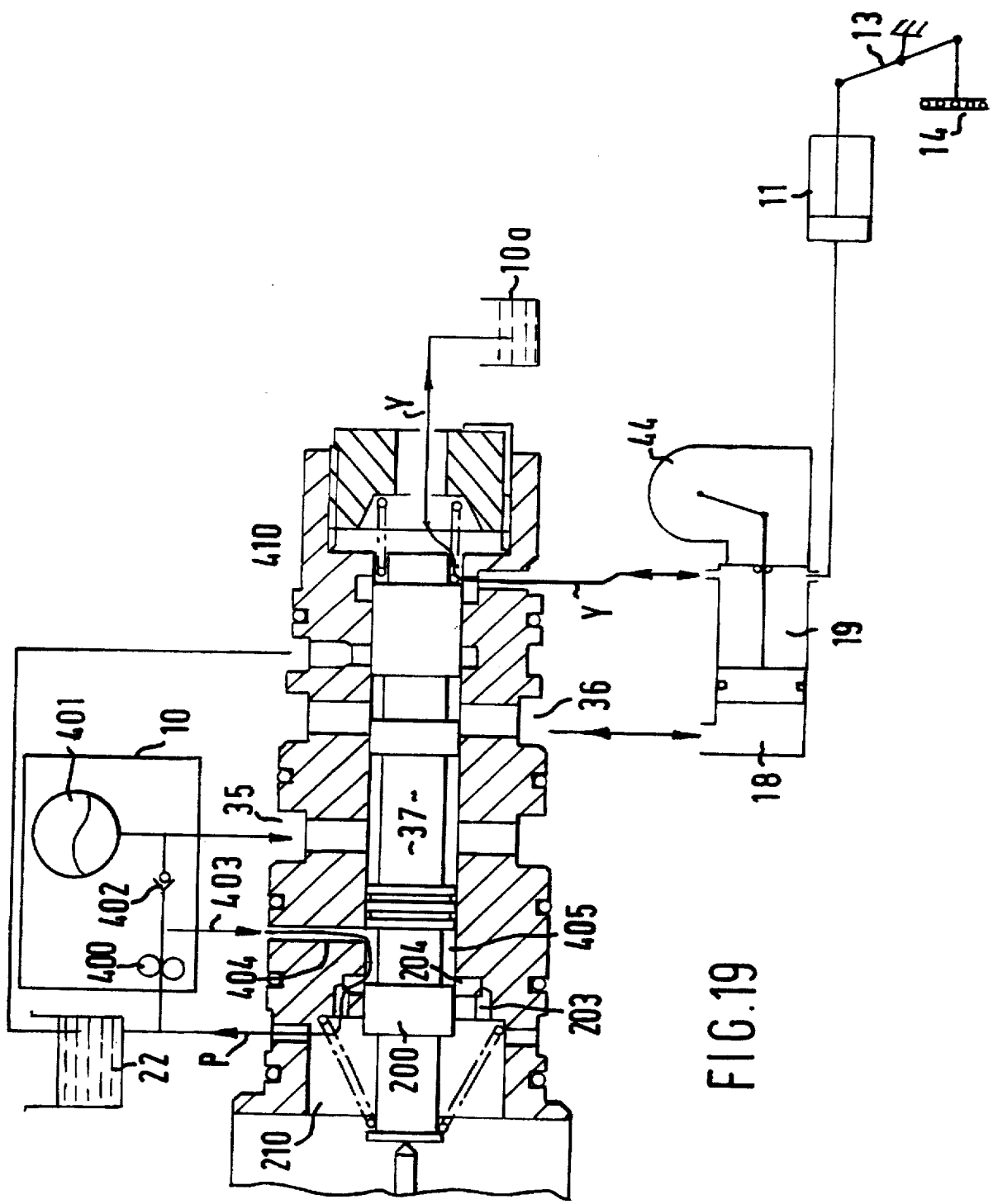
FIG. 19 shows a still further form of actuation system with a pump start-up circuit to relieve pump load at start up.

FIG. 19 shows a similar arrangement to FIG. 16 in which the powerpack 10 includes an electrically driven pump 400 which draws fluid from reservoir 22 and charges an accumulator 401 via a non-return valve 402. The output from the pump 400 is fed via line 403 and drilling 404 to a wasted portion 405 of spool 37 and hence via groove 204 and drillings 203 into chamber 210 from whence the fluid returns to reservoir 22. Thus, with the solenoid of valve 12a deactivated and the spool 37 in the position shown in FIG. 19 the pump output is dumped back directly to reservoir 22 via path P. Also any pressure on the pump side of non-return valve 402 is similarly relieved.

When the accumulator 401 is fully charged the pump 400 can be switched off and the spool 37 returned to its deactivated position if no supply or exhaust of fluid is necessary from slave 11.

The above dumping flow path P has the advantage that on pump start-up the pump is not required to get up to speed against a high pump load since the fluid being pumped is returned directly to the reservoir 22 via path P. Also the lines connecting the pump 400 with the accumulator 401 can be kept at a relatively low pressure since they are connected to reservoir 22 when the solenoid is deactivated thus extending the life of the lines and the general reliability of the system.

Also in FIG. 19 the landing arrangement of spool 37 is changed so that the recuperation path Y to chamber 19 is provided at the other end of the spool under the control of spool land 410. This enables the length of spool 37 and hence the entire valve to be reduced.

On the initial movement of spool 37 the dumping path P is closed off by land 200 and land 410 closes off the recuperation passage Y to chamber 19 from reservoir 10a.

I claim:

1. A displacement valve for use in an hydraulic actuation system, said displacement valve comprising a housing with a piston slideable in a bore of the housing to define two fluid tight chambers one on each side of the piston, one chamber being in fluid connection with a slave cylinder and the other chamber being connected with a source of pressurised fluid, a sensing means operatively connected with the piston, a passage interconnecting said chambers, and a valve means disposed in said passage to cut off or control the passage of fluid between said chambers and hence between said source and slave cylinder, said valve means being arranged to be open when said piston is in a retracted condition in which said other chamber is at a minimum volume and said slave cylinder is not operated and said valve means being arranged to close as said piston is displaced along said bore against a bias force in response to a rise in said pressurised fluid thus raising the pressure level in said one chamber to cause actuating movement of the slave cylinder proportional to the movement of said piston and which is measured by said sensing means.

2. An actuation system comprising a source of pressurized fluid which actuates a slave cylinder at a first location via a fluid flow path, a displacement means in said fluid flow path, said displacement means being at a second location remote from the slave cylinder and including a component which is displaced by the pressurized fluid from the source to provide a displacement proportional to the actuating movement of the slave cylinder caused by the pressurized fluid, and sensing means at the second location operable to measure said displacement to indicate the actuating movement of the slave cylinder at the first location.

3. A system according to claim 2 in which the displacement means comprises a piston axially slideable in a bore of a housing to define two fluid tight chambers one on each side of the piston, one chamber being in fluid connection with the slave cylinder and the other chamber being connected with the source of pressurised fluid, and a displacement member which moves with the piston and extends outside the housing for co-operation with the sensing means.

4. A system according to claim 3 in which the displacement means is in the form of a displacement valve with a passage interconnecting said chambers on each side of the piston, and a valve means disposed in said passage to cut off or control the passage of fluid between said chambers and hence between said source and slave cylinder, said valve means being arranged to be open when said piston is in a retracted condition in which said other chamber is at a minimum volume and said slave cylinder is not operated, and said valve means being arranged to close as said piston is displaced along said bore against a bias force in response to a rise in the pressure of said pressurised fluid thus raising the pressure level in said one chamber to cause actuating movement of the slave cylinder proportional to the movement of said piston.

5. A system according to claim 4 in which the valve means which controls the passage of actuating fluid between the two chambers comprises a check valve which is spring-loaded to a normally closed condition, said check valve being opened when said piston is in its retracted condition by pin means which contacts an end of the bore and unseats the check valve.

6. A system according to claim 3 in which the said one chamber communicates with a reservoir when the piston is in a retracted condition and said other chamber is at a minimum volume, said communication with the reservoir closing as said piston is displaced along said bore in response to a rise in the pressure in said other chamber thus raising the pressure level in said one chamber to cause actuating movement of the slave cylinder proportional to the movement of said piston.

7. A system according to claim 6 in which the piston has two axially spaced seals thereon which seal said one and other chambers and which define a fluid containing chamber between said axially spaced seals, the fluid containing chamber also communicating with the reservoir in the retracted condition of the piston and being closed off from the reservoir as said piston is displaced along said bore.

8. A system according to claim 3 in which the piston also slides in sealed contact over an inner fixed piston member to define said one chamber between the slidable piston and the inner piston and the other chamber between the slidable piston and housing bore.

9. A system according to claim 8 in which a reservoir surrounds said fixed inner piston member and a recuperation port is provided in the slidable piston which allows communication between said one chamber and the reservoir when the slidable piston in its retracted condition and the other chamber is at is minimum volume.

10. A system according to claim 8 in which the fixed piston member includes a replenishment passage which communicates with said one chamber, flow of fluid through the replenishment passage being controlled by a valve member which is held open by resilient means when the slidable piston is in its retracted condition in which the other chamber is at its minimum volume and which is closed by initial movement of the slidable piston on pressurisation of said other chamber.

11. A system according to claim 3 in which the supply of pressurised fluid to and exhaust of fluid from said other chamber is controlled by axial displacement of a spool of a solenoid operated spool valve which also controls the connection of a recuperation port of said one chamber with a reservoir.

12. A system according to claim 11 in which initial axial displacement of the spool to pressurise said other chamber also cuts off communication between the recuperation port and said one chamber.

13. A system according to claim 11 in which the reservoir which communicates with the recuperation port also receives the fluid which is exhausted from said other chamber.

14. A system according to claim 11 in which an anti-cavitation feature is provided under which the piston can draw fluid into said one chamber around seals in the solenoid operated spool valve on rapid return of the piston towards its retracted condition.

15. A system according to claim 11 in which the source of pressurised fluid is provided by a pump and the spool of the solenoid operated valve is also arranged to dump the output of the pump to a sump when the other chamber is not pressurised, this dump path being cut-off on movement of the spool to begin pressurisation of the other chamber.

16. A system according to claim 3 in which a rod extends from one side of the piston along said bore and exits from said housing, and sensing means in the form of a transducer is connected with said rod to provide a signal output representative of the actuating movement of the slave cylinder.

17. A system according to claim 2 in which the displacement means is adjacent the source of pressurised fluid.

18. A system according to claim 2 in which the source of pressurised fluid comprises an hydraulic powerpack, including an hydraulic reservoir, pump and accumulator, said displacement means also being part of said powerpack.

19. A system according to claim 3 in which a rod extends from one side of the piston along said bore and exits from said housing, said rod comprising a first linkage member of a mechanism for interconnecting the operation of a vehicle clutch and throttle, the first linkage member being movable in a first direction in response to disengagement of the clutch and in a second direction in response to engagement of the clutch, the mechanism also including a second linkage member connected with the vehicle throttle and moveable in said first direction to close the throttle and in said second direction to open the throttle, and a lost motion connection connecting the first and second linkage members, said lost-motion connection allowing initial movement of the first linkage member in the first and second directions without any corresponding movement of the second linkage member in said first and second directions.

20. An actuation system according to claim 2 including a displacement valve comprising a housing with a piston slideable in a bore of the housing to define two fluid tight chambers one on each side of the piston, one chamber being connected with the slave cylinder and the other chamber being in fluid connection with the source of pressurised fluid, a passage interconnecting said chambers, and a valve means disposed in said passage to cut-off or control the passage of fluid between said chambers and hence between said source and slave cylinder, said valve means being arranged to be open when said piston is in a retracted condition in which said other chamber is at a minimum volume and said slave cylinder is not operated and said valve means being arranged to close as said piston is displaced along said bore against a bias force in response to a rise in said pressurised fluid thus raising the pressure level in said one chamber to cause actuating movement of the slave cylinder proportional to the movement of said piston.

21. A mechanism according to claim 19 in which the lost motion connection includes a resilient means providing the force transmitting path between the first and second linkage members for movement of the second linkage member in said first direction by the first linkage member.

22. A mechanism according to claim 19 in which the resilient means is provided by a second piston within the rod or an extension thereof which is operatively connected with the second linkage member and is biased in said first direction by spring means.

23. A mechanism according to claim 19 in which the spring means is a fixed rate spring which provides a fixed phase relationship between the movement of the first and second linkage members in said first direction.

24. A mechanism according to claim 19 in which the second piston defines a chamber within the rod which is connected with said one chamber to allow movement of the second piston within the rod dependent on the level of pressure in said one chamber to enable the phase relationship between the movement of the first and second linkage members in said first direction to be varied.

25. A system according to claim 19 in which the rod also operates a hill holder brake control valve.

26. A system according to claim 2 in which the slave cylinder operates a vehicle clutch.

27. A system according to claim 20 in which the slave cylinder operates a vehicle clutch.

28. A mechanism according to claim 19 which includes a displacement valve comprising a housing with a piston slideable in a bore of the housing to define two fluid tight chambers, one on each side of the piston, one chamber being connected with a slave cylinder and the other chamber being in fluid connection with a source of pressurized fluid, a sensing means operatively connected with the piston, a passage interconnecting said chambers, and a valve means disposed in said passage to either cut-off or control the passage of fluid between said chamber, in which a rod extends from one side of the piston along said bore and exits from said housing, the rod comprising the first lingage member of the mechanism.

29. An actuation system comprising a source of pressurized fluid interconnected with a slave cylinder via a displacement means, said displacement means including a component which is displaced by the pressurized fluid from the source to provide a displacement proportional to the actuating movement of the slave cylinder caused by the pressurized fluid, and sensing means operable to measure said displacement to indicate the actuating movement of the slave cylinder, and in which system the displacement means comprises a piston axially slideable in a bore of a housing to define two fluid tight chambers one on each side of the piston, one chamber being connected with the slave cylinder and the other chamber being connected with the source of pressurized fluid, and a displacement member which moves with the piston and extends outside the housing for co-operation with the sensing means.

* * * * *